(12) United States Patent
Santner

(10) Patent No.: US 9,550,426 B2
(45) Date of Patent: Jan. 24, 2017

(54) CURRENT TRANSMISSION DEVICE FOR CHARGING ELECTRICAL ENERGY STORES OF VEHICLES AT OVERHEAD CHARGING STATIONS

(71) Applicant: SCHUNK BAHN- UND INDUSTRIETECHNIK GMBH, Bergheim (AT)

(72) Inventor: Josef Santner, Hallwang (AT)

(73) Assignee: SCHUNK BAHN- UND INDUSTRIETECHNIK GMBH, Bergheim (AT)

( * ) Notice: Subject to any disclaimer, the term of this patent is extended or adjusted under 35 U.S.C. 154(b) by 68 days.

(21) Appl. No.: 14/380,760

(22) PCT Filed: Feb. 26, 2013

(86) PCT No.: PCT/EP2013/053830
§ 371 (c)(1),
(2) Date: Aug. 25, 2014

(87) PCT Pub. No.: WO2013/127800
PCT Pub. Date: Sep. 6, 2013

(65) Prior Publication Data
US 2015/0021134 A1 Jan. 22, 2015

(30) Foreign Application Priority Data

Feb. 27, 2012 (DE) .................. 10 2012 202 955

(51) Int. Cl.
*B60L 11/00* (2006.01)
*B60L 11/18* (2006.01)

(52) U.S. Cl.
CPC ............ *B60L 11/1816* (2013.01); *B60L 11/18* (2013.01); *B60L 11/185* (2013.01);
(Continued)

(58) Field of Classification Search
CPC ................ B60L 5/18; B60L 5/19; B60L 5/20; B60L 5/205; B60L 5/222; B60L 5/22; B60L 5/24; B60L 5/26; B60L 5/28; B60L 11/18; B60L 11/1816
See application file for complete search history.

(56) References Cited

U.S. PATENT DOCUMENTS 2,636,856 A * 4/1953 Suggs .................. C25B 11/0478
204/290.03
3,730,312 A * 5/1973 Leger ........................ B60L 5/22
191/66

(Continued)

FOREIGN PATENT DOCUMENTS

CN 101580028 A 11/2009
CN 102101439 A 6/2011
(Continued)

OTHER PUBLICATIONS

EV Charging Systems Commitee: II (R) SAE Electric Vehicle Conductive Charge Coupler JI772 II , 19961001, vol. J1772, No. Rev. NOV2001 Oct. 1, 1996 (Oct. 1, 1996), pp. 1-32, XP002666503, Retrieved from the Internet: URL:http://bzwxw.com/soft/UploadSoft/new5/.

*Primary Examiner* — Jason C Smith
(74) *Attorney, Agent, or Firm* — King & Schickli, PLLC

(57) ABSTRACT

A vehicle-side current transmission device (4) for the stationary charging of electrical energy stores of vehicles (7) at charging stations includes current-supplying contact surfaces (13, 14, 14) arranged above the vehicle (7), wherein a charge current collector (4) formed as an articulated arm system (4) is multi-pole and has, for making stationary contact with the current-supplying contact surfaces (13, 14, 15), at least two isolated electrical contact elements (1, 2, 3) that transmit different electrical phases. The collector enables electrical contacts by a single current collector, (Continued)

Figure 1:
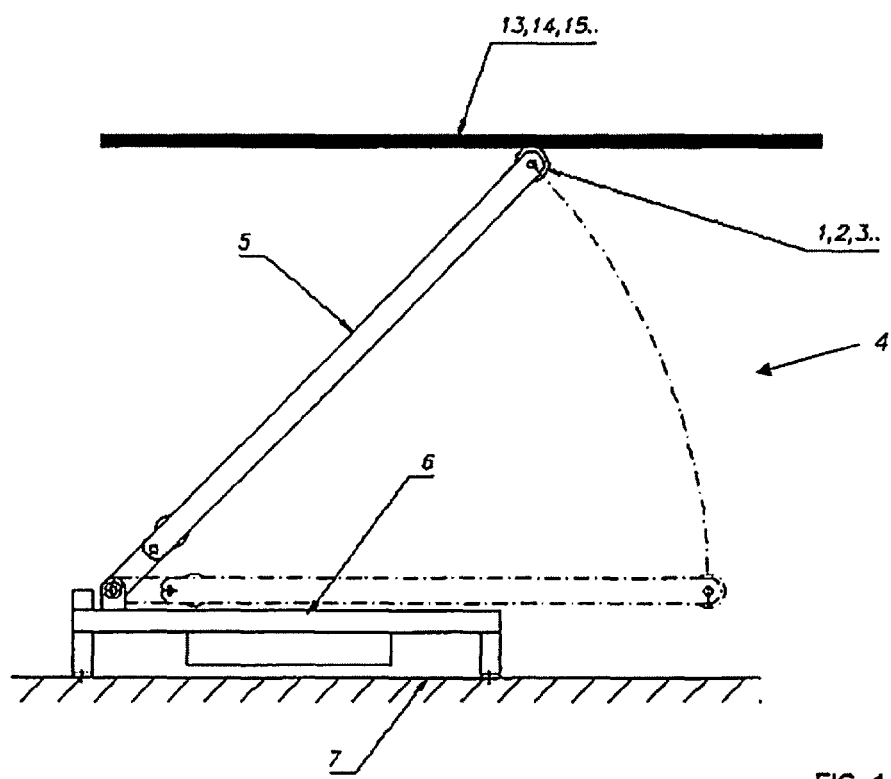

which transmit different electrical phases while grounding the vehicle. The articulated arm system allows for an especially compact design with low weight, and enables the vehicle driver to simply position the vehicle below the overhead charging station, coupled with a reliable contacting of the contact surfaces.

9 Claims, 2 Drawing Sheets

(52) U.S. Cl.
CPC ....... *B60L 11/1818* (2013.01); *B60L 2200/26* (2013.01); *Y02T 10/7005* (2013.01); *Y02T 10/7072* (2013.01); *Y02T 90/121* (2013.01); *Y02T 90/128* (2013.01); *Y02T 90/14* (2013.01)

(56) References Cited

U.S. PATENT DOCUMENTS

| | | | | |
|---|---|---|---|---|
| 3,812,304 A * | 5/1974 | Leger | ................ | B60L 5/22 191/66 |
| 3,908,806 A * | 9/1975 | Leger | ................ | B60L 5/22 191/59 |
| 4,113,074 A * | 9/1978 | Stemmann | ................ | B60L 5/18 191/66 |
| 4,363,940 A * | 12/1982 | Bertelsbeck | ................ | B60L 5/18 191/59.1 |
| 4,471,175 A * | 9/1984 | Gronlund | ................ | B60L 5/19 105/199.2 |
| 5,193,656 A * | 3/1993 | Hoffmann | ................ | B05B 7/0012 191/49 |
| 5,293,947 A * | 3/1994 | Stratton | ................ | B60K 6/46 180/2.1 |
| 5,464,082 A * | 11/1995 | Young | ................ | B60L 5/18 191/2 |
| 5,975,259 A * | 11/1999 | Gebhard | ................ | B60L 5/22 191/50 |
| 9,227,577 B2 * | 1/2016 | Kurita | ................ | B60R 13/08 |
| 2002/0086558 A1 * | 7/2002 | Blanvillain | ................ | B60L 5/22 439/32 |
| 2007/0072440 A1 * | 3/2007 | Spacie | ................ | B60L 5/205 439/1 |
| 2011/0094841 A1 * | 4/2011 | Mazumdar | ................ | B60L 7/10 191/33 R |
| 2011/0315497 A1 * | 12/2011 | Laurent | ................ | B60L 5/20 191/49 |
| 2013/0048458 A1 * | 2/2013 | Rastl | ................ | B60L 5/205 191/59.1 |
| 2013/0140121 A1 * | 6/2013 | Huber | ................ | B60L 5/36 191/59.1 |
| 2013/0192944 A1 * | 8/2013 | Zimmerman | ................ | B60L 5/36 191/38 |
| 2013/0220757 A1 * | 8/2013 | Reiser | ................ | B60L 5/205 191/45 R |
| 2013/0256073 A1 * | 10/2013 | Yamada | ................ | B60L 5/20 191/60.2 |
| 2013/0270050 A1 * | 10/2013 | Yamada | ................ | B60L 5/20 191/59 |
| 2014/0202816 A1 * | 7/2014 | Kuo | ................ | B60L 5/20 191/59.1 |
| 2014/0305924 A1 * | 10/2014 | Uchtmann | ................ | B60L 5/02 219/202 |
| 2014/0338558 A1 * | 11/2014 | Luebben | ................ | B61C 3/00 105/1.4 |
| 2015/0021134 A1 * | 1/2015 | Santner | ................ | B60L 11/1818 191/45 R |
| 2015/0239349 A1 * | 8/2015 | Keil | ................ | B60L 5/08 191/59.1 |
| 2015/0283921 A1 * | 10/2015 | Zimmerman | ................ | B60M 1/12 191/38 |

FOREIGN PATENT DOCUMENTS

| | | |
|---|---|---|
| DE | 3101655 A1 | 12/1981 |
| EP | 1097835 A1 | 5/2001 |
| EP | 2380767 A1 | 10/2011 |
| FR | 2336272 A1 | 7/1977 |
| GB | 1480311 A | 7/1977 |
| JP | H03139102 A | 6/1991 |
| JP | 2005094952 A | 4/2005 |
| JP | 2008228412 A | 9/2008 |
| JP | 2009113691 A | 5/2009 |
| KR | 20100126120 A | 12/2010 |

* cited by examiner

CURRENT TRANSMISSION DEVICE FOR CHARGING ELECTRICAL ENERGY STORES OF VEHICLES AT OVERHEAD CHARGING STATIONS

FIELD OF THE INVENTION

The invention relates to a vehicle-side current transmission device for the stationary charging of electrical energy stores of vehicles at charging stations by means of energy-supplying contact surfaces arranged above the vehicle.

BACKGROUND OF THE INVENTION

Transportation systems are generally known from the state of the art in which electrically driven vehicles are supplied with electrical energy via overhead lines. Means of transportation of this kind are used in particular in public local passenger transport as rail-bound trolley cars or as lane-bound trolley busses. For supplying traction current, a current collector with electrical sliding contacts is in constant sliding contact with the current-carrying overhead wire hanging above the vehicle. Transportation systems of this kind require substantial investments in the traffic infrastructure to be provided, in particular in terms of the costs for installation and maintenance of the overhead line system. Moreover, a transportation system of t his sort is bound to a fixed traffic routing in contrast to "free" traffic. In addition to this dependence on rails and lanes, the appearance of overhead lines is often perceived as unaesthetic, especially in the area of the city center.

In the course of increasing electro-mobility, these disadvantages can be overcome by the use of vehicles with rechargeable energy stores. However, on the one hand, these means of transportation require a charging infrastructure including charging stations at which the accumulators of the electric vehicles can be stationarily charged at certain distances. These charging stations can preferably be arranged in stop bays in the form of overhead charging stations for public transportation vehicles so that the charging process can take place during the stay of the vehicle at a stop.

On the other hand, in addition to the electric drive concept, the vehicles must be equipped with devices for current transmission, i.e. for the electrical contacting of the overhead charging stations and for collecting the charging current. Previously known current collector systems are only designed for transmitting a driving current, i.e. for supplying power while the vehicle is in motion, the supplied electrical energy being directly converted into kinetic energy via an electric drive device without being stored.

SUMMARY OF THE INVENTION

The invention disclosed in European patent application EP 2 380 767 A1 shows a charging device for vehicles of the public transportation system which are equipped with electrical energy stores. However, said device is designed for a charging process which takes place during the passage of the vehicle along a charging station. For this purpose, the vehicle and the charging station show a contacting of the current rail and the guiding system, wherein the length of the current rail is calculated such that the duration of contact during the passage with a certain speed is sufficient for transmitting the necessary electrical energy.

Thus, it is the object of the present invention to develop a current transmission device for the stationary charging of the electrical energy stores of an electric vehicle, in particular for an electric vehicle for passenger transport in local public transportation, which is as compact and simple as possible and which allows making quick and secure electrical contact to the current-carrying contact surface of an overhead charging station, coupled with simple positioning of the electric vehicle. Additionally, the device is to be robust against constant high mechanical stresses.

This object is attained in connection with the preamble of claim 1 by a charge current collector which is formed as an articulated arm system, is designed to be multi-pole and has, for making stationary contact with the current-supplying contact surfaces, at least two electrical contact elements which are isolated from one another and transmit different electrical phases.

Since only limited space is available for mounting a device for current collection on the roof of an electric vehicle, in particular if the latter is provided with other units for the use in passenger transport, such as an air conditioning unit, a charge current collector that is formed as an articulated arm system allows reliable deploying and retracting of the contact elements to/from the contact surface(s) of a charging station installed above the vehicle with little space required. Owing to the design as an articulated arm system, the current collector forms a compact structural unit in the retracted state during driving, but can be quickly extended to the desired height when the vehicle halts at a stop that is equipped with a charging station.

For making stationary contact with the current-supplying contact surface of a charging station running above the vehicle, at least two electrical contacts are arranged on the charge current collector formed as an articulated arm system so that the phase contacts (voltage potentials) required in each case for charging the electrical energy stores can be made with the respective contact surfaces of the charging station via a single current collector. Thus, the current transmission device according to the invention permits contacting and conducting the phases plus and minus necessary for charging the electrical energy store in direct current charging, for example, via a single current collector.

In a preferred embodiment, the contact elements are arranged lying next to each other vertically to the driving direction and isolated from one another on a common charge current collector. In this embodiment, all different contact elements, i.e. the phase contact elements as well as a potential grounding contact, are arranged lying next to each other on a single, shared charge current collector. Hence, the contact elements are provided with an isolation and sufficiently large isolation distances, the relative lateral distance among the contact elements being dictated by the arrangement of the current-supplying contact surface of the charging station and being calculated such that a fault-free contacting is possible, in particular such that the risk of short circuits can be precluded.

Advantageously, the charge current collector has at least one electrical contact element which is formed as a grounding contact. Since in contrast to rail-bound vehicles, a trolley bus is largely isolated from the ground potential by its rubber tires, a ground connection can be achieved via a grounding contact on the charge current collector and a corresponding grounding contact surface on the charging station. In this manner, both the phase contacts and the grounding can be produced via a single charge current collector.

In another embodiment, the articulated arm system is formed as a single-arm system or as a multi-part scissor system and has a single base frame which is tightly connected to the vehicle and to which an articulated lower arm of the articulated arm system is pivotably attached.

An articulated arm system formed in this manner has a low weight, which is advantageous with regard to a total vehicle weight desired to be as low as possible considering the plurality of accelerations that are necessary in scheduled service of an electric bus, for example. Moreover, the articulated arm designs have the advantage of being simple and requiring little maintenance. The necessary stability is achieved by means of only one base frame which is rigidly connected to the vehicle and to which a lower articulated arm of the articulated arm system is pivotably attached.

It is further advantageous that the circumference of the contact elements vertical to the driving direction is sufficiently large to be able to position the vehicle below the current-supplying contact surfaces of the charging station. Taking into account the arrangement of the charge current contact surface, the length of the contact elements vertical to the driving direction is designed such that the vehicle driver has sufficient room to position the vehicle below the charging device, even if there is slight lane offset because of obstacles having to be avoided, for example, so that the contact surfaces of the charging device can be reliably contacted.

In another preferred embodiment, (a) connecting line(s) of the electrical contact element(s) is/are integrated in an electrically isolated manner in the articulated arm(s). The charge current collected via the contact elements is transmitted to the on-board electronic system of the vehicle via connection lines which run along the articulated arms in an electrically isolated manner.

It is also possible to design components of the articulated arm system and of the base frame as current-carrying conductors for connecting a contact element. In such an embodiment, electrically conductive parts of the charge current collector directly form the connection line for a contact element.

The current conduction of the other contact elements can take place via further connection lines which are installed in an electrically isolated manner on the articulated arms.

For producing a secure contacting, the individual contact elements can be movably arranged on the current collector. Thus, the necessary contact pressing force of the individual contact elements on the current-supplying contact surfaces can also be ensured if production or assembly tolerances are to be compensated or if the vehicle is in a vertically inclined position.

BRIEF DESCRIPTION OF THE DRAWING FIGURES.

Figure 2:
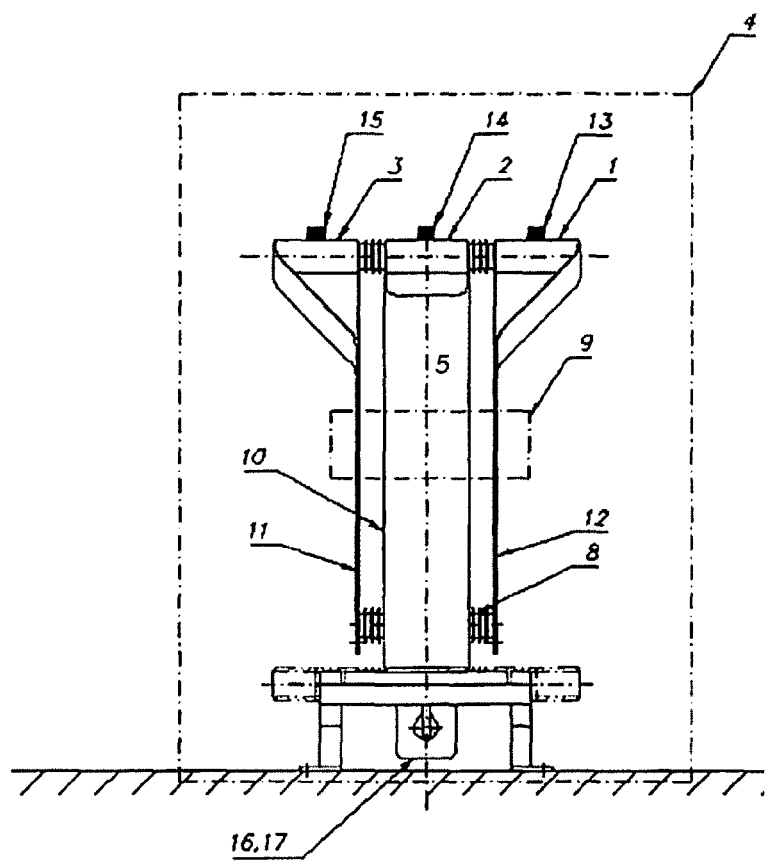

Further advantageous design features arise from the following description and from the drawings, which illustrate a preferred embodiment of the invention by way of examples. In the figures:

FIG. 1: shows a schematic illustration of a charge current collector according to the invention in a lateral view along the longitudinal axis of a vehicle, and FIG. 2: shows a schematic illustration of the charge current collector according to the invention in a lateral view vertical to the longitudinal axis of the vehicle.

DETAILED DESCRIPTION OF THE INVENTION

FIG. 1 shows a schematic illustration of the structure of the charge current collector 4 according to the invention. In the illustrated embodiment, the charge current collector is formed as a one-arm articulated arm system with an articulated arm 5. The articulated arm 5 is pivotably attached to a base frame 6 which is permanently mounted on the roof surface of an electric vehicle 7. In the retracted state, the articulated arm 5 rests on the base frame 6 parallel to the roof surface. On the end of the articulated arm 5 facing away from the pivot bearing, three contact elements 1, 2, 3 are arranged lying next to each other on an axis extending vertically to the driving direction. By pivoting open the articulated arm 5, the contact elements 1, 2, 3 can be brought into contact with the current-supplying contact surfaces 13, 14, 15 of a charging station which are arranged above the vehicle 7. In this context, current-supplying contact surfaces 13, 14, 15 are to be understood to also mean grounding contact surfaces for connection to the ground potential.

In FIG. 2, the charge current collector 4 according to the invention is shown in a schematic illustration vertical to the longitudinal axis of the vehicle. The articulated arm 5 is in the deployed position so that the contact elements 1, 2, 3 of the charge current collector 4 touch the corresponding contact surfaces 13, 14, 51 of the charging station. The charge current running through the outer contact elements 13, 15 is conducted via connection lines 11, 12 mounted in an isolated manner 8 on the articulated arm 5. A current running through the center contact element 14 can be conducted directly via the electrically conductive articulated arm 5.

For deploying the contact elements 1, 2, 3, the charge current collector 4 has a lift drive 16, which is designed to be pneumatic, electric, hydraulic or mechanical with a spring system, and a lowering drive 17 for lowering the contact elements 1, 2, 3 which is also designed to be pneumatic, electric, hydraulic or mechanical with a spring store. The contact elements 1, 2, 3 can also be lowered by utilizing gravity.

With the charge current collector according to the present invention, a current transmission device has been created which makes it possible that at least two or a plurality of electrical contacts can be produced via a single current collector, said electrical contacts being able to transmit different electric phases and to simultaneously achieve a grounding of the vehicle. Owing to the design as an articulated arm system, the current transmission device according to the invention can be realized with low weight in a particularly compact configuration. A vehicle-side charging device of such design allows the vehicle driver to position the vehicle in a simple manner below the overhead charging station, coupled with a reliable contacting of the contact surfaces. The simple and robust design in connection with sophisticated lift and lowering drives is further characterized by a low maintenance load and is robust in view of constant high mechanical stresses, which occur in particular in the operation of local public transportation with a plurality of lifting and lowering processes at the stops.

The invention claimed is:

1. A current transmission device for the stationary charging of vehicles (7) having electrical energy stores on charging stations by means of power-supplying contact surfaces (13, 14, 15) arranged above the vehicles, comprising: a charge current collector (4) formed as an articulated arm system and designed to be multi-pole for making stationary contact with the power-supplying contact surfaces (13, 14, 15), at least two electrical contact elements (1, 2, 3) transmitting different electrical phases, said at least two electrical contact elements (1, 2, 3) are arranged lying next to each other on an axis extending vertically to the driving direction and are isolated from one another on a common current charge collector (4), said articulated arm system allowing deploying and retracting of the at least two electrical contact elements (1, 2, 3), wherein at least one of said at least two electrical contacts elements (1, 2, 3) is formed as a grounding contact.

2. The current transmission device according to claim 1, wherein the articulated arm system is formed as a single-arm system and has a single base frame (6) which is tightly connected to the vehicle (7) and wherein an articulated arm (5) of the articulated arm system is pivotably attached to the single base frame (6).

3. The current transmission device according to claim 1, wherein the circumference of the at least two electrical contact elements (1, 2, 3) vertical to the driving direction is sufficiently large to be able to position the vehicle (7) below the power-supplying contact surfaces (13, 14, 15) of the charging station.

4. The current transmission device according to claim 1, wherein at least one connection line (11, 12) of the at least two electrical contact elements (1, 2, 3) is integrated in an electrically isolated manner in the articulated arm system.

5. The current transmission device according to claim 1, wherein the at least two electrical contact elements (1, 2, 3) are movably arranged on the charge current collector (4) for producing a secure contacting.

6. The current transmission device according to claim 1, wherein the charge current collector (4) has a lift drive (16) for deploying the at least two electrical contact elements (1, 2, 3), which is designed to be pneumatic, electric, hydraulic or mechanical with a spring system.

7. The current transmission device according to claim 1, wherein the charge current collector has a lowering drive (17) for lowering the at least two electrical contact elements (1, 2, 3), which is designed to be pneumatic, electric, hydraulic or mechanical with a spring store.

8. The currently transmission device according to claim 1, wherein the at least two electrical contact elements (1, 2, 3) are lowered by utilizing gravity.

9. The current transmission device according to claim 1, wherein the articulated arm system is formed as a multi-part scissor system and has a base frame (6) which is tightly connected to the vehicle (7) and wherein an articulated lower arm (5) of the articulated arm system is pivotably attached to the base frame (6).

* * * * *